United States Patent
Lee (10) Patent No.: US 9,124,709 B2
(45) Date of Patent: Sep. 1, 2015

(54) CIRCUIT APPARATUS FOR RECOGNIZING EARPHONE IN MOBILE TERMINAL

(75) Inventor: Woo-Cheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1142 days.

(21) Appl. No.: 12/897,995

(22) Filed: Oct. 5, 2010

(65) Prior Publication Data
US 2011/0085673 A1   Apr. 14, 2011

(30) Foreign Application Priority Data

Oct. 14, 2009   (KR) .................. 10-2009-0097585

(51) Int. Cl.
| H04R 1/10 | (2006.01) |
| H04M 1/60 | (2006.01) |
| H01R 24/58 | (2011.01) |
| H04R 5/04 | (2006.01) |
| H04M 1/725 | (2006.01) |

(52) U.S. Cl.
CPC ............. *H04M 1/6058* (2013.01); *H01R 24/58* (2013.01); *H04R 1/1041* (2013.01); *H04R 5/04* (2013.01); *H04M 1/72527* (2013.01); *H04R 2420/05* (2013.01)

(58) Field of Classification Search
CPC ........ H04R 5/033; H04R 5/04; H04R 1/1016; H04R 1/1041; H04R 2420/03; H04R 2420/05; H04R 2420/07; H04M 1/6058; H04M 1/72527
USPC ............. 381/74, 77, 309, 122, 111–115, 384; 12/74; 307/125; 439/668; 455/575, 455/568, 575.2, 556.1
See application file for complete search history.

(56) References Cited

U.S. PATENT DOCUMENTS

| 6,066,973 | A  | * | 5/2000 | Sekino et al. | 327/313 |
| 6,470,197 | B1 |   | 10/2002 | Tuoriniemi et al. | |
| 6,594,366 | B1 | * | 7/2003 | Adams | 381/74 |
| 6,922,572 | B2 | * | 7/2005 | Lim | 455/570 |
| 6,975,813 | B1 | * | 12/2005 | Inoue et al. | 398/197 |
| 7,564,966 | B2 | * | 7/2009 | Sano | 379/419 |
| 8,243,945 | B2 | * | 8/2012 | Li | 381/74 |
| 2004/0080440 | A1 | * | 4/2004 | Su et al. | 341/141 |
| 2004/0100275 | A1 | * | 5/2004 | Shin | 324/538 |
| 2004/0137960 | A1 | * | 7/2004 | Chung | 455/569.2 |
| 2005/0258890 | A1 | * | 11/2005 | Miyazaki | 327/427 |
| 2006/0182047 | A1 | * | 8/2006 | Ibe | 370/260 |
| 2006/0258400 | A1 | * | 11/2006 | Lee | 455/557 |
| 2007/0164861 | A1 | * | 7/2007 | Sano | 340/568.4 |
| 2008/0144846 | A1 | * | 6/2008 | Sollenberger et al. | 381/58 |

(Continued)

FOREIGN PATENT DOCUMENTS

| EP | 1 199 867 A1 | 4/2002 |
| WO | 99/03294 A2 | 1/1999 |

*Primary Examiner* — Xu Mei
(74) *Attorney, Agent, or Firm* — Jefferson IP Law, LLP (57) ABSTRACT

A circuit apparatus for recognizing an earphone in a mobile terminal is provided. The apparatus includes a plurality of devices, a wiring for recognizing the number of poles of the earphone, and a comparator. The plurality of devices are connected between a microphone bias power and a wiring that receives a signal from a microphone of an earphone. The wiring that recognizes the number of poles of the earphone branches from a wiring between at least two of the devices. The comparator compares a voltage of the wiring that recognizes the number of poles with a reference voltage to output a result signal.

13 Claims, 6 Drawing Sheets

(56) References Cited

U.S. PATENT DOCUMENTS

| | | |
|---|---|---|
| 2008/0164994 A1* | 7/2008 | Johnson et al. ............... 340/533 |
| 2009/0136058 A1* | 5/2009 | Choi et al. ..................... 381/74 |
| 2009/0285415 A1* | 11/2009 | Wu ................................ 381/113 |
| 2009/0296952 A1* | 12/2009 | Pantfoerder et al. ............ 381/74 |
| 2011/0188669 A1* | 8/2011 | Lu .................................. 381/81 |
| 2011/0268289 A1* | 11/2011 | Baranwal et al. ............... 381/74 |

* cited by examiner

CIRCUIT APPARATUS FOR RECOGNIZING EARPHONE IN MOBILE TERMINAL

PRIORITY

This application claims the benefit under 35 U.S.C. §119 (a) of a Korean patent application filed in the Korean Intellectual Property Office on Oct. 14, 2009 and assigned Serial No. 10-2009-0097585, the entire disclosure of which is hereby incorporated by reference.

BACKGROUND OF THE INVENTION

1. Field of the Invention

The present invention relates to a circuit apparatus for recognizing an earphone in a mobile terminal. More particularly, the present invention relates to a circuit apparatus for recognizing whether a pole of an earphone and a SEND/END key are input.

2. Description of the Related Art

A conventional mobile terminal supports a three-pole earphone in order to output a stereo sound source, and supports a multi-functional four-pole earphone in order to support voice communication and control a function of a mobile terminal. Recently, because both a three-pole earphone and a four-pole earphone are commonly used, the mobile terminal is able to determine use of the three-pole earphone and the four-pole earphone using a common use 3.5 inch ear jack that supports both the three-pole earphone and the four-pole earphone.

Figure 1:
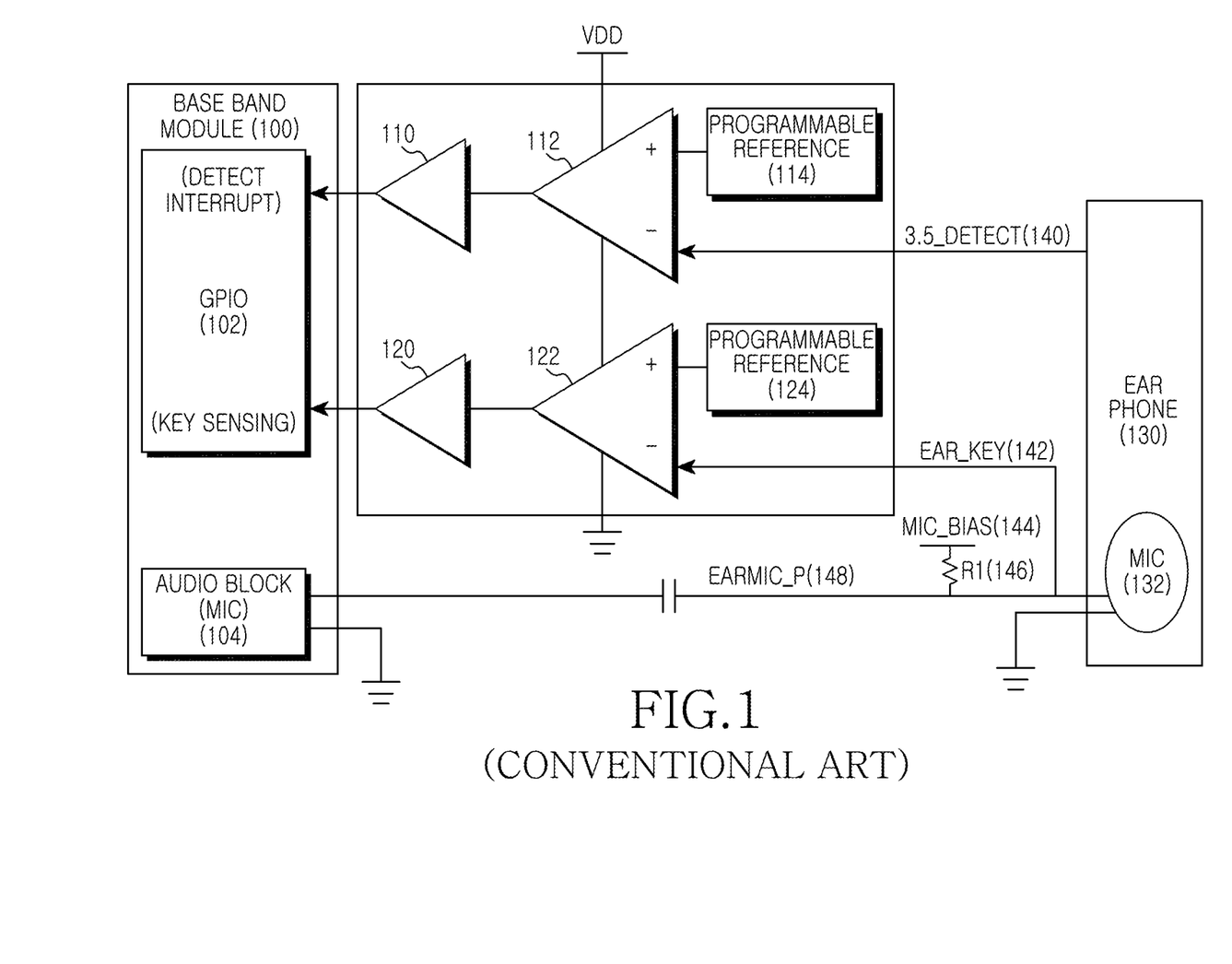
FIG. 1 is a block diagram illustrating a circuit for recognizing an earphone in a conventional mobile terminal.

FIG. 1 illustrates a circuit diagram for recognizing an earphone in a conventional mobile terminal.

Referring to FIG. 1, the mobile terminal includes a baseband module 100 and a plurality of circuit devices for recognizing an earphone 130. The baseband module 100 includes a General Purpose Input Output (GPIO) 102 for receiving a detect/interrupt signal and a key sensing signal, and an Audio Block 104 for receiving an audio signal from a microphone 132.

A 3.5_DETECT end 140 of the mobile terminal maintains a low state when the earphone 130 is not connected, regardless of the number of poles of the earphone. More specifically, the 3.5 DETECT end 140 provides a voltage lower than a reference voltage 114 to a first comparator 112 if the earphone 130 is not connected. On the other hand, the 3.5 DETECT end 140 maintains a high state when the earphone 130 is connected in order to provide a voltage higher than the reference voltage 114 to the first comparator 112, thereby informing the baseband module 100 that the earphone 130 has been connected via the first comparator 112 and the first inverter 110.

An EAR_KEY end 142 transmits a different signal to the baseband module 100 depending on whether the connected earphone 130 is a three pole or a four pole earphone. More specifically, the EAR_KEY end 142 branches from a microphone line (i.e., EARMIC_P end 148) that receives a voice signal from the earphone 130 and transmits the voice signal to the Audio Block 104. When the four-pole earphone 130 is connected, the EAR_KEY end 142 transmits a different signal to the baseband module 100 depending on whether the SEND/END key is input.

That is, when the earphone 130 is connected to the mobile terminal, a bias voltage is supplied to the EARMIC_P end 148 by a MIC_BIAS 144 and a pull-up resistor R1 146, and accordingly, a bias voltage is supplied to the EAR_KEY end 142. At this point, when the connected earphone 130 is a three-pole earphone, the EARMIC_P end 148 contacts a GND of the earphone, so that the EAR_KEY end 142 becomes a low state to provide a voltage lower than a reference voltage 124 to a second comparator 122. In contrast, when the earphone 130 connected to the mobile terminal is a four-pole earphone, the EARMIC_P end 148 is connected to a microphone resistor of the earphone 130 and the EAR_KEY end 142 is placed into a voltage state that is higher than the reference voltage. Thus, the EAR_KEY end 142 provides a voltage higher than the reference voltage 124 to the second comparator 122 thereby informing the baseband module 100 that a four-pole earphone has been connected via the second comparator 122 and a second inverter 120. Therefore, the baseband module 100 is able to determine whether a currently connected earphone is a three-pole or four-pole earphone.

In addition, while the four-pole earphone 130 is connected to the mobile terminal and provides a voltage higher than the reference voltage 124 to the second comparator 122, when the SEND/END key of the four-pole earphone 130 is input, the EAR_KEY end 142 is connected with GND and becomes a low state. In the low state, a voltage lower than the reference voltage 124 is provided to the second comparator 122 so that the baseband module 100 is able to recognize that the SEND/END key is input and perform a corresponding operation.

As described above, in the conventional mobile terminal, the EAR_KEY end 142, which discriminate whether a connected earphone is a three-pole or a four-pole earphone and recognizes input of the SEND/END key, branches from a microphone line. That is, the EAR_KEY end 142 branches from the EARMIC_P end 148 that receives a voice signal from the earphone. In this case, the EAR_KEY end 142 and the EARMIC_P end 148 may influence each other.

Furthermore, in the conventional mobile terminal, noise from Time Division Multiple Access (TDMA) Radio Frequency (RF) coupling and noise from power circuitry is detrimental to the EAR_KEY end 142 due to the wiring of the EAR_KEY end 142. The detrimental TDMA noise to the EAR_KEY end 142 in the structure of FIG. 1 has an influence on the EARMIC_P end 148, and consequently causes interference to a voice of a user input from a microphone 132 of the earphone 130.

Accordingly, a structure in which the EARMIC_P end 148 is not influenced by the EAR_KEY end 142 in the circuit apparatus of the mobile terminal for recognizing the number of poles of an earphone is needed.

SUMMARY OF THE INVENTION

An aspect of the present invention is to address at least the above-mentioned problems and/or disadvantages and to provide at least the advantages described below. Accordingly, an aspect of the present invention is to provide a circuit apparatus for recognizing an earphone in a mobile terminal.

Another aspect of the present invention is to provide a circuit apparatus for recognizing whether a pole of an earphone and a SEND/END key are input in a mobile terminal.

Another aspect of the present invention is to provide a circuit apparatus for recognizing an earphone pole in order to reduce a Time Division Multiple Access (TDMA) noise in a mobile terminal.

Another aspect of the present invention is to provide a circuit apparatus for preventing a wiring that receives a microphone signal of an earphone from being influenced by a wiring that recognizes an earphone pole in a mobile terminal.

Another aspect of the present invention is to provide a circuit apparatus for separating a wiring that recognizes an earphone pole and a wiring that receives a microphone signal of an earphone.

Another aspect of the present invention is to provide a circuit apparatus for separating a wiring that recognizes an earphone pole and a microphone wiring using two resistors and a capacitor in a mobile terminal.

Another aspect of the present invention is to provide a circuit apparatus for connecting two resistors between a bias power and a microphone wiring of an earphone, and allowing a wiring that recognizes an earphone pole to branch from an end between the two resistors.

Another aspect of the present invention is to provide a circuit apparatus for connecting a capacitor connected with a ground to a wiring that recognizes an earphone pole to remove a TDMA noise in a mobile terminal.

In accordance with an aspect of the present invention, a circuit apparatus for recognizing an earphone in a mobile terminal is provided. The apparatus includes a plurality of devices connected between a microphone bias power and a wiring that receives a signal from a microphone of an earphone, a wiring for recognizing the number of poles of the earphone, that branches from between at least two of the devices, and a comparator for comparing a voltage of the wiring that recognizes the number of poles with a reference voltage to output a result signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a circuit apparatus for separating a wiring that determines whether an earphone pole and a SEND/END key are input, and a wiring that receives a microphone signal of an earphone.

Figure 2:
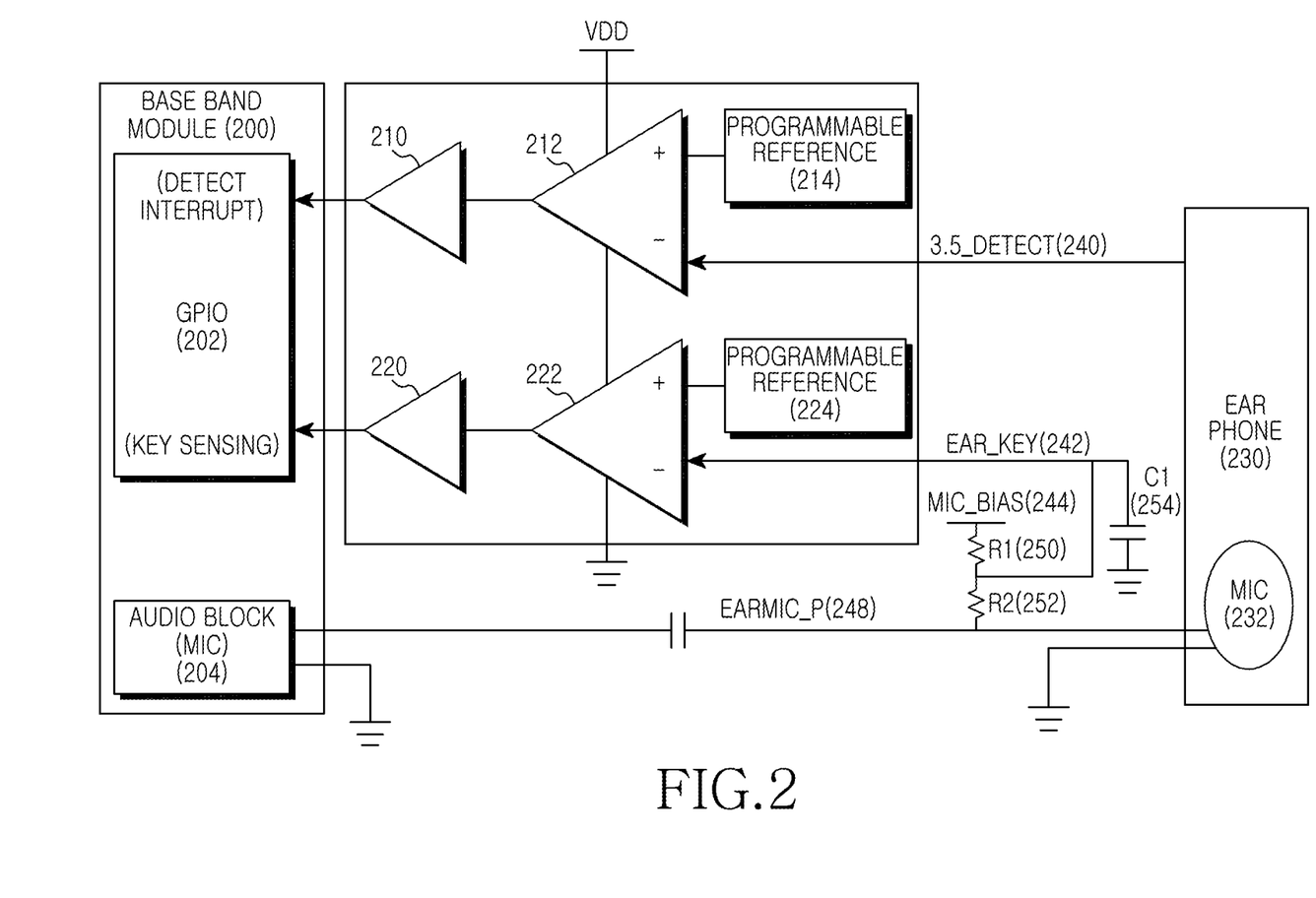
FIG. 2 is a block diagram illustrating a circuit for recognizing an earphone according to an exemplary embodiment of the present invention.

FIG. 2 is a block diagram illustrating a circuit for recognizing an earphone according to an exemplary embodiment of the present invention.

Referring to FIG. 2, the mobile terminal for recognizing the earphone includes a baseband module 200 and a plurality of circuit devices for recognizing an earphone 230. Here, the baseband module 200 includes a General Purpose Input Output (GPIO) 202, and an audio block 204. The plurality of circuit devices are described below.

A 3.5_DETECT end 240 of the mobile terminal performs a function of providing a signal representing whether an earphone 230 is connected to the mobile terminal. The 3.5_DETECT end 240 provides the signal to the GPIO 202 of the baseband module 200. More specifically, when an earphone 230 is not connected, the 3.5_DETECT end 240 maintains a low state and provides the low state voltage, which is lower than a reference voltage 214, to a first comparator 212. In contrast, when an earphone 230 is connected, the 3.5_DETECT end 240 maintains a high state and provides a voltage that is higher than the reference voltage 214 to the first comparator 212. Here, the reference voltage 214 of the first comparator 212 is set by a developer or manufacturer.

When the earphone 230 is not connected, the first comparator 212 receives a voltage lower than the reference voltage 214 from the 3.5_DETECT end 240. In response, the first comparator 212 outputs a high signal. On the other hand, when the earphone 230 is connected, the first comparator 212 receives a voltage higher than the reference voltage 214 from the 3.5_DETECT end 240 and outputs a low signal.

A first inverter 210 converts a high signal received from the first comparator 212 into a low signal and provides the converted low signal to the GPIO 202 of the baseband module 200. That is, when the earphone 230 is not connected, the first inverter 210 receives a high signal from the first comparator 212 and converts the high signal into a low signal. On the other hand, when the earphone 230 is connected, the first inverter 210 receives a low signal from the first comparator 212 and converts the low signal into a high signal.

The GPIO 202 of the baseband module 200 determines whether the earphone 230 is connected using a signal input from the first inverter 210. That is, when a low signal is input from the first inverter 210, the GPIO 202 determines that the earphone 230 is not connected. On the other hand, when a high signal is input from the first inverter 210, the GPIO 202 determines that the earphone 230 is connected.

In addition, the GPIO 202 determines whether the earphone 230 connected to the mobile terminal is a three-pole earphone or a four-pole earphone using a signal input from a second inverter 220. When the earphone 230 is a four-pole earphone, the GPIO 202 detects whether a SEND/END key is input to process a function for performing a relevant function. That is, while a high signal is input from the first inverter 210, when a low signal is input from the second inverter 220, the GPIO 202 determines that a three-pole earphone has been connected. Furthermore, while a high signal is input from the first inverter 210, when a high signal is input from the second inverter 220, the GPIO 202 determines that a four-pole earphone has been connected. Here, when determining that a four-pole earphone has been connected through the first inverter 210 and the second inverter 220, when a signal from the second inverter 220 changes to 'low' and then changes to 'high', the GPIO 202 determines that a SEND/END key of the four-pole earphone has been input to perform a function for operating the audio block 204.

In addition, the audio block 204 included in the baseband module 200 receives and processes a microphone signal of the earphone 230 connected to the mobile terminal via an EARMIC_P end 248.

When a four-pole earphone is connected and the SEND/END key is input, the EARMIC_P end 248 receives a user's voice signal from the four-pole earphone to provide the voice signal to the audio block 204. The EARMIC_P end 248 receives a bias voltage from a MIC_BIAS 244 via resistors R1 250 and R2 252. Also, the EARMIC_P end 248 receives a voice input from a microphone 232.

The second inverter 220 converts a high signal input from a second comparator 222 into a low signal, and converts a low signal into a high signal to provide the same to the GPIO 202 of the baseband module 200.

When a three-pole earphone is connected, the second comparator 222 receives a voltage lower than a reference voltage 224 from the EAR_KEY end 242 to output a high signal. When a four-pole earphone is connected, the second comparator 222 receives a voltage higher than the reference voltage 224 to output a low signal. Here, the reference voltage 224 is set by a developer or manufacturer. In addition, when a SEND/END key of the four-pole earphone is input, the second comparator 222 receives a voltage lower than the reference voltage 224 from the EAR_KEY 242 to output a high signal.

The EAR_KEY end 242, leading to the second comparator 222, branches from an electrical location between the two resistors R1 250 and R2 252 that connect the MIC_BIAS 244 and the EARMIC_P end 248, and connects in parallel to a bypass capacitor C1 254 that is connected to ground GND. Here, the capacitor C1 254 connected to the EAR_KEY end 242 removes a Time Division Multiple Access (TDMA) noise, and accordingly, stabilizes a microphone bias power. In an exemplary implementation, the capacitor C1 254 may be a tantalum capacitor or a Multi Layer Ceramic Chip (MLCC) capacitor.

The EAR_KEY end 242 provides a different value to the second comparator 222 depending on whether a connected earphone 230 is a three-pole or a four-pole earphone. When a four-pole earphone is connected, the EAR_KEY end 242 transmits a different voltage value to the second comparator 222 depending on whether a SEND/END key is input. At this point, since a voltage value of the EAR_KEY end 242 branches from the wiring between the resistors R1 250 and R2 252, the voltage of the EAR_KEY end 242 is influenced by the resistors R1 250 and R2 252, and a microphone resistor MIC_R (not shown) of the four-pole earphone.

When a three-pole earphone is connected, the EAR_KEY end 242 provides a voltage lower than the reference voltage 224 to the second comparator 222. When a four-pole earphone is connected, the EAR_KEY end 242 provides a voltage higher than the reference voltage 224 to the second comparator 222. When a SEND/END key is input while the four-pole earphone is connected, the EAR_KEY end 242 provides a voltage lower than the reference voltage 224 to the second comparator 222.

That is, the resistors R1 250 and R2 252 should be set such that the EAR_KEY end 242 provides a voltage lower than the reference voltage 224 to the second comparator 222 when a three-pole earphone is connected. Furthermore, the resistors R1 250 and R2 252 should be set such that the EAR_KEY end 242 provides a voltage higher than the reference voltage 224 to the second comparator 222 when a four-pole earphone is connected.

An exemplary method for determining resistance values of the resistors R1 250 and R2 252 is described below.

When a four-pole earphone is connected, a voltage applied to the EAR_KEY end 242 should be higher than the reference voltage 224 of the second comparator 222, so that the resistors R1 250 and R2 252 should satisfy Equation (1), $$\frac{R2 + \text{MIC\_R}}{R1 + R2 + \text{MIC\_R}} \times \text{MICBIAS\_VDD} > \text{VDD\_REF} \qquad (1)$$

where MIC_R is a microphone resistor, MICBIAS_VDD is a microphone bias voltage, and VDD_REF is the reference voltage 224 of the second comparator 222. At this point, the resistor R1 should have a greater value than that of the resistor R2.

In addition, since a voltage of the EAR_KEY end 242 should be lower than the reference voltage 224 of the second comparator 222 with a SEND/END key pressed while the four-pole earphone is connected, and should be higher than the reference value 224 of the second comparator 222 with the SEND/END key not pressed, Equation (2) should be satisfied, $$\frac{R2}{R1 + R2} \times \text{MICBIAS\_VDD} < \text{VDD\_REF} \qquad (2)$$

where MICBIAS_VDD is a microphone bias voltage, and VDD_REF is the reference voltage 224 of the second comparator 222.

When a three-pole earphone is connected, a voltage applied to the EAR_KEY end 242 should be lower than the reference voltage 224 of the second comparator 222. At this point, it is determined that a microphone does not exist at the three-pole earphone and thus a microphone resistance value becomes zero ohms, so that the resistors R1 250 and R2 252 should meet Equation (2).

Here, a case in which the number of poles is determined such that a voltage input to the second comparator 222 is reversed when the earphone is connected is described. That is, the case where recognition is made such that a voltage input to the second comparator 222 is lowered lower than the reference voltage 224 when a four-pole earphone is connected, and a voltage input to the second comparator 222 is raised higher than the reference voltage 224 when a three-pole earphone is connected is described. In this case, Equations (1) and (2) are designed reversely as in Equations (3) and (4), $$\frac{R2 + \text{MIC\_R}}{R1 + R2 + \text{MIC\_R}} \times \text{MICBIAS\_VDD} < \text{VDD\_REF} \quad (3)$$

$$\frac{R2}{R1 + R2} \times \text{MICBIAS\_VDD} > \text{VDD\_REF} \quad (4)$$

where MIC_R is a microphone resistor, MICBIAS_VDD is a microphone bias voltage, and VDD_REF is the reference voltage 224 of the second comparator 222.

Expansion of Equations (3) and (4) shows that MIC_R× R1<0 should be met. However, in reality, since the product of two resistance values cannot be a negative number, it is revealed that designing the above reverse case cannot be made.

An example of the above-described circuit construction is described. Here, description is made using an example in which the two resistors R1 250 and R2 252 have values of 1.8 kΩ and 390 kΩ, respectively, a microphone resistor MIC_R has a value of 1.2 kΩ, a reference voltage VDD_REF has a voltage of 0.5 V, and a microphone bias voltage MICBIAS_VDD has a voltage of 2 V.

Experiments under the above conditions have shown that when the earphone is not connected, a voltage of 1.9 V is applied to the EAR_KEY end 242. The experiments have also shown that when a four-pole earphone is connected, 1.5 kΩ is maintained at the EAR_KEY end 242 and a voltage of 0.93 V is applied to the EAR_KEY end 242. The experiments have further shown that when a three-pole earphone is connected, 0.9 kΩ is maintained at the EAR_KEY end 242 and a voltage of 0.35 V is applied to the EAR_KEY end 242.

That is, when a four-pole earphone is connected to the EAR_KEY end 242, a voltage of 0.93 V, which is higher than the reference voltage of 0.5 V of the second comparator 222, is applied, and when a three-pole earphone is connected, a voltage of 0.35 V, which is lower than the reference voltage of 0.5 V of the second comparator 222, is applied, so that poles of the earphone are normally discriminated.

A resistance value in the above exemplary embodiment may change when design is made with consideration of an error within which the reference voltage changes depending on a temperature characteristic and a neighboring environment. In addition, though an exemplary embodiment of the present invention has been described using the case where poles of the four-pole earphone include a sequence of Left, Right, MIC (ADC, SEND-END), and GND, a hardware design may change in the case where the four poles are configured differently, for example, the four poles include a sequence of Left, Right, GND, and MIC (ADC, SEND-END).

Figure 3A:
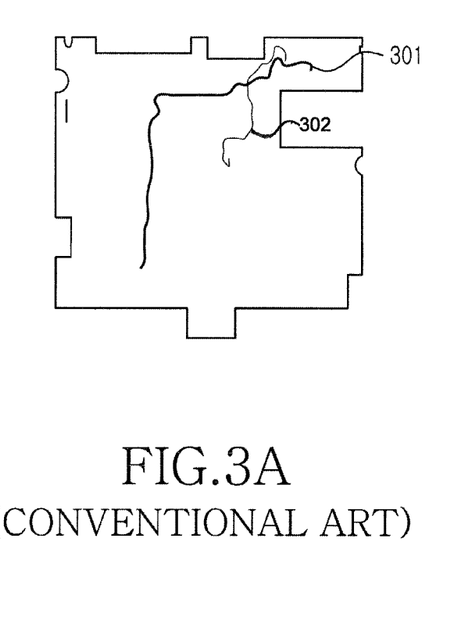
FIGS. 3A and 3B are views illustrating a microphone wiring of an earphone and a wiring that recognizes an earphone pole in the conventional mobile terminal and a mobile terminal according to an exemplary embodiment of the present invention.
Figure 3B:
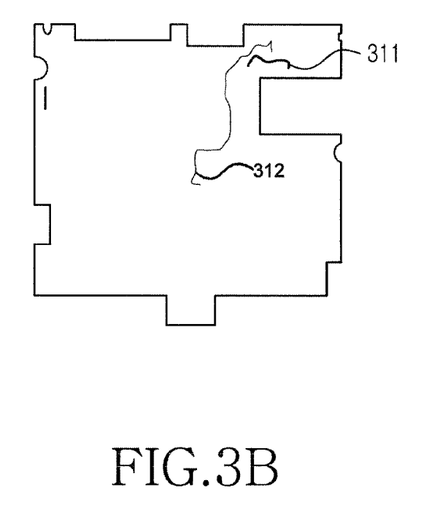

FIGS. 3A and 3B are views illustrating a microphone wiring of an earphone and a wiring that recognizes an earphone pole in the conventional mobile terminal and a mobile terminal according to an exemplary embodiment of the present invention.

Referring to FIG. 3A, in a conventional mobile terminal, since a wiring that recognizes the number of poles 302 of an earphone branches from a microphone wiring 301 of an earphone, the microphone wiring 301 is lengthened unnecessarily, so that it is not easy to manage TDMA noise, caused by RF coupling, and power noise. In contrast, referring to FIG. 3B, in a mobile terminal according to an exemplary embodiment of the present invention, a wiring that recognizes the number of poles 312 of an earphone is separated from a microphone wiring 311 of an earphone, so that the microphone wiring 311 of the earphone is shortened and an influence from the TDMA noise is reduced.

Figure 4:
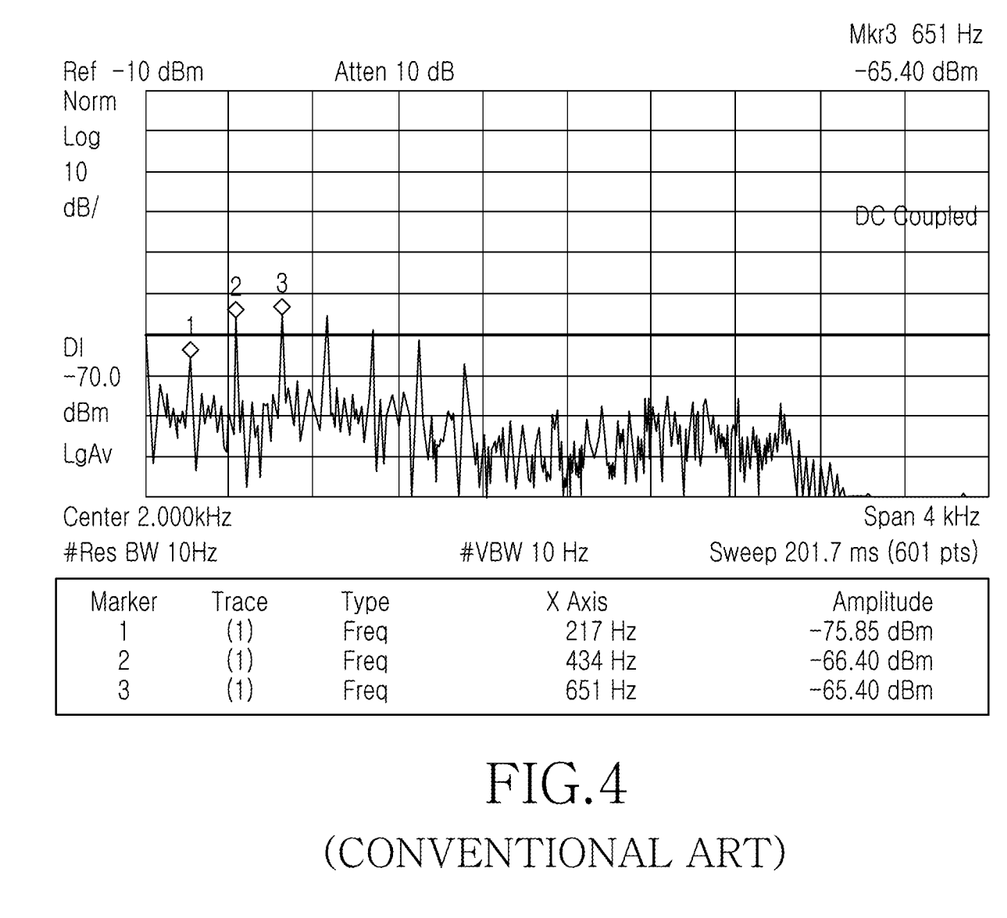
FIGS. 4 to 6 are graphs illustrating measurement results of a Time Division Multiple Access (TDMA) noise in the conventional mobile terminal and a mobile terminal according to an exemplary embodiment of the present invention.
Figure 5:
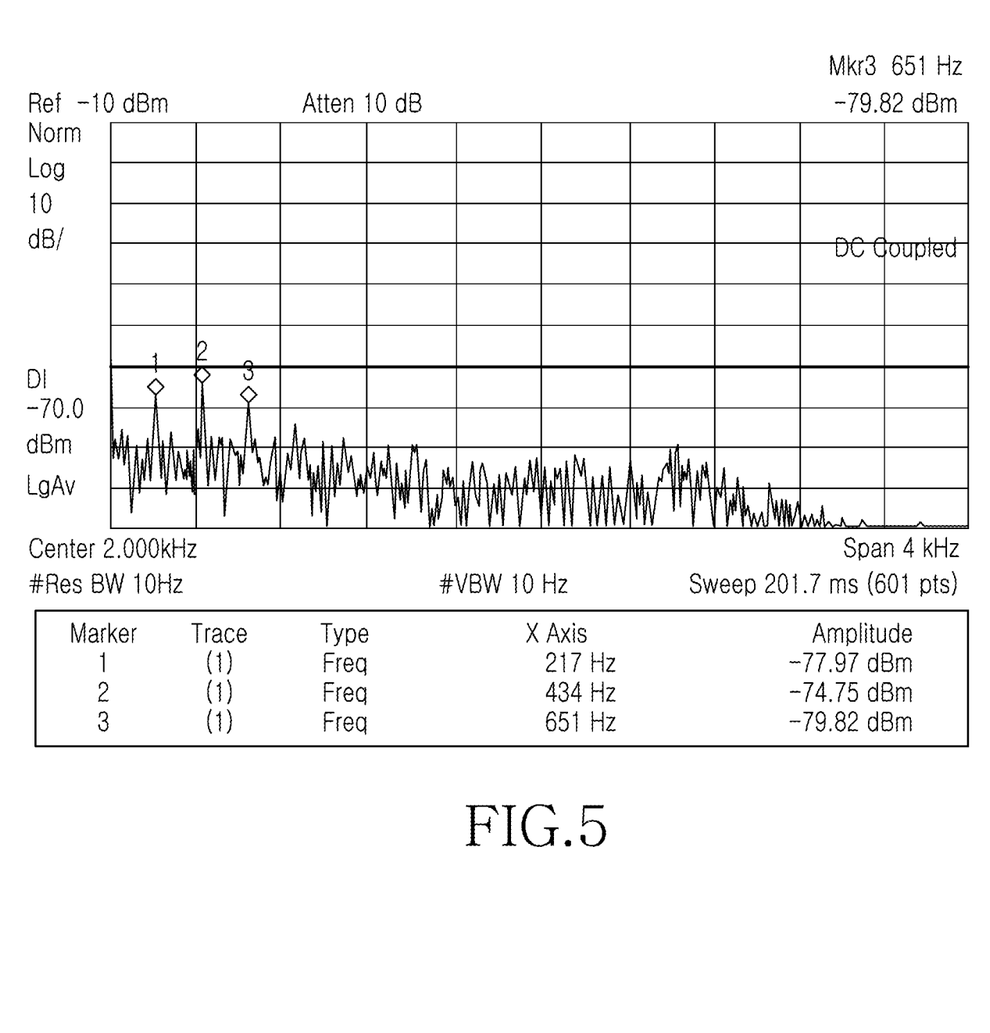
Figure 6:
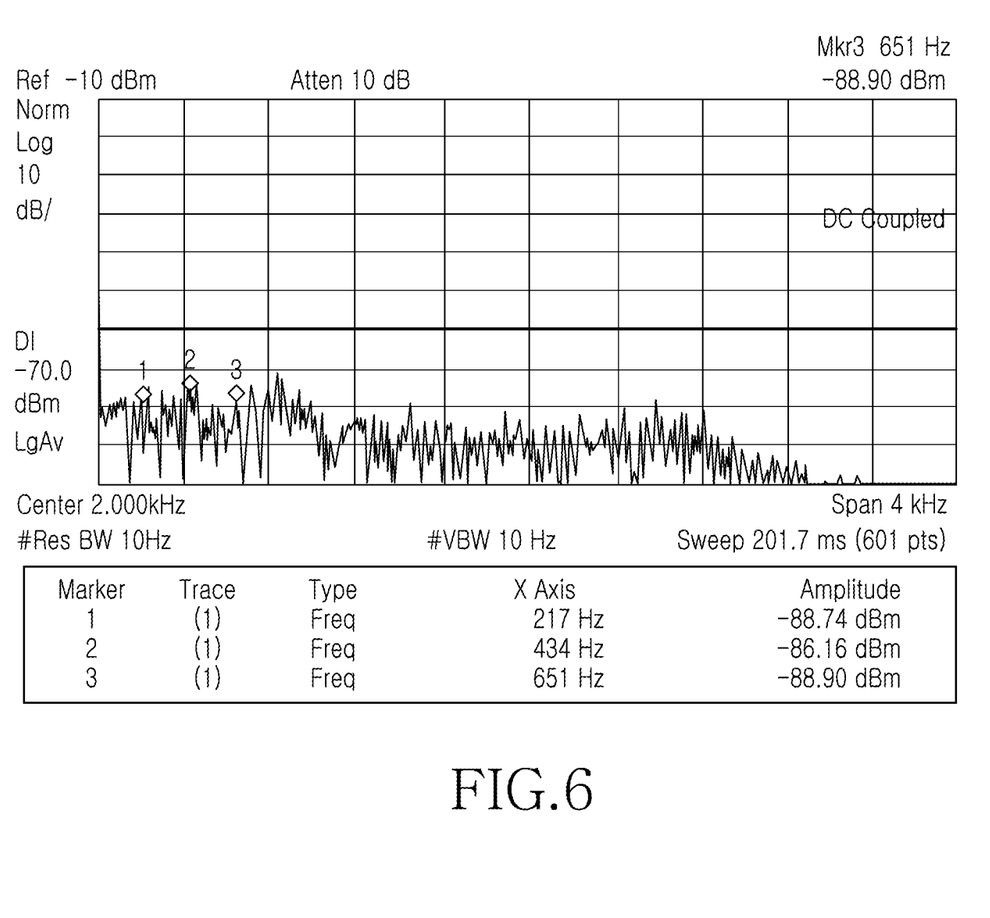

FIGS. 4 to 6 illustrate graphs of measurement results of TDMA noise in a conventional mobile terminal and a mobile terminal according to an exemplary embodiment of the present invention. Here, a horizontal axis denotes a frequency, and a vertical axis denotes a size of a noise.

FIG. 4 illustrates TDMA noise of a conventional mobile terminal, FIG. 5 illustrates TDMA noise in a case where a wiring that recognizes the number of poles of an earphone is separated from a microphone wiring of an earphone, and FIG. 6 illustrates TDMA noise in a case where a wiring that recognizes the number of poles of an earphone is separated from a microphone wiring of an earphone, and then a capacitor is connected to the wiring that recognizes the earphone pole.

Referring to FIGS. 4 to 6, it is revealed that when a circuit is configured as in an exemplary embodiment of the present invention, the microphone wiring of the earphone is less influenced by TDMA noise as compared to the conventional circuit.

Though, according to an exemplary embodiment of the present invention, a configuration of a circuit apparatus for allowing a wiring that recognizes the number of poles of an earphone to branch has been described using an example of two resistors, it is to be understood that this is merely for convenience. That is, more than two resistors may be used as well as a plurality of active devices such as an inductor, a bead, etc, which are not influenced by a DC component of a microphone bias power may be added for the purpose of noise reduction of microphone power. In addition, exemplary embodiments of the present invention may include a circuit apparatus for allowing a wiring that recognizes the number of poles of an earphone to branch by combining passive devices such as a resistor and active devices. As described above, the circuit apparatus configuration may change within the scope and the operational principle of the present invention.

As described above, an exemplary embodiment of the present invention has an effect of preventing a microphone wiring of an earphone from being influenced by a wiring that recognizes the number of poles of an earphone, and reducing TDMA noise by connecting two resistors between a bias power and the microphone wiring of the earphone, allowing the wiring that recognizes the number of poles of an earphone to branch from an end between the two resistors, and connecting a capacitor connected to a ground to the wiring that recognizes the number of poles of an earphone in a mobile terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A circuit apparatus for recognizing an earphone in a mobile terminal, the apparatus comprising:
   a plurality of devices connected between a microphone bias power and a wiring that receives a signal from a microphone of an earphone;
   a wiring, for recognizing the number of poles of the earphone, that branches from between at least two of the devices and that is separate from microphone wiring of an earphone; and
   a comparator for comparing a voltage of the wiring that recognizes the number of poles with a reference voltage to output a result signal.

2. The apparatus of claim 1, wherein each of the plurality of devices comprise at least one of a passive device and an active device.

3. The apparatus of claim 1, wherein the plurality of devices comprise two resistors.

4. The apparatus of claim 1, wherein the plurality of devices comprises an active device that is not influenced by a Direct Current (DC) component of the microphone bias power.

5. The apparatus of claim 1, further comprising a capacitor for connecting the wiring that recognizes the number of poles of the earphone with a ground.

6. The apparatus of claim 3, wherein when a four-pole earphone is connected to the mobile terminal, the two resistors satisfy the following equation:

$$\frac{R2 + MIC\_R}{R1 + R2 + MIC\_R} \times MICBIAS\_VDD > VDD\_REF$$

where R1 and R2 are respective resistance values of the two resistors, MICR is the resistance value of a microphone resistor, MICBIAS_VDD is a microphone bias voltage, and VDD_REF is the reference voltage.

7. The apparatus of claim 3, wherein, when a three-pole earphone is connected to the mobile terminal, the two resistors satisfy the following equation:

$$\frac{R2}{R1 + R2} \times MICBIAS\_VDD > VDD\_REF$$

where R1 and R2 are respective resistance values of the two resistors, MICBIAS_VDD is a microphone bias voltage, and VDD_REF is the reference voltage.

8. The apparatus of claim 1, wherein, when a three-pole earphone is connected to the mobile terminal, a voltage lower than the reference voltage is applied to the wiring that recognizes the number of poles, when a four-pole earphone is connected to the mobile terminal, a voltage higher than the reference voltage is applied to the wiring that recognizes the number of poles, and when a key for inputting a microphone signal is pressed while the four-pole earphone is connected, a voltage lower than the reference voltage is applied to the wiring that recognizes the number of poles.

9. The apparatus of claim 1, further comprising:
    an inverter for converting an output signal from the comparator; and
    a baseband module for recognizing a signal of the inverter to detect the number of poles of an earphone connected to the mobile terminal, and, when a four-pole connection is detected, for detecting whether a key for inputting a microphone signal is pressed.

10. The apparatus of claim 1, further comprising a second comparator for determining if the earphone is connected to the mobile terminal.

11. The apparatus of claim 10, further comprising a second inverter for converting a signal output from the second comparator and for outputting the converted signal to the baseband module.

12. The apparatus of claim 10, further comprising a second reference voltage, wherein the second reference voltage is input to the second comparator for determining if the earphone is connected to the mobile terminal.

13. The apparatus of claim 1, further comprising a capacitor for connecting the wiring that recognizes the number of poles of the earphone with a ground, wherein the plurality of devices comprise two resistors.

* * * * *